United States Patent
Huang

(10) Patent No.: US 6,935,633 B2
(45) Date of Patent: Aug. 30, 2005

(54) SHAFT SEALING DEVICE HAVING A POSITIONING RING AND A RETAINING RING THEREOF

(75) Inventor: Cheng-Shiou Huang, Kaohsiung (TW)

(73) Assignee: Scenic Precise Element Inc., Kaohsiung (TW)

( * ) Notice: Subject to any disclaimer, the term of this patent is extended or adjusted under 35 U.S.C. 154(b) by 36 days.

(21) Appl. No.: 10/705,945

(22) Filed: Nov. 13, 2003

(65) Prior Publication Data

US 2004/0251633 A1 Dec. 16, 2004

(30) Foreign Application Priority Data

Jun. 12, 2003 (TW) .................................. 92210752 U

(51) Int. Cl.[7] ............................................. F16J 15/34
(52) U.S. Cl. ..................................... 277/372; 277/373
(58) Field of Search ............................... 277/358, 370, 277/371, 372–373, 374–375

(56) References Cited

U.S. PATENT DOCUMENTS

| | | | | |
|---|---|---|---|---|
| 3,578,344 A | * | 5/1971 | Yost ........................... | 277/373 |
| 4,639,000 A | * | 1/1987 | Warner ........................ | 277/373 |
| 4,989,882 A | * | 2/1991 | Warner et al. ............... | 277/370 |
| 5,797,602 A | * | 8/1998 | Less ............................ | 277/372 |
| 6,145,841 A | * | 11/2000 | Maeda ........................ | 277/358 |
| 6,357,753 B1 | * | 3/2002 | Yamasaki et al. ........... | 277/372 |
| 6,460,858 B1 | * | 10/2002 | Kitajima et al. ............ | 277/370 |
| 6,685,191 B2 | * | 2/2004 | Toal ............................ | 277/370 |
| 2002/0060431 A1 | * | 5/2002 | Takahashi ................... | 277/372 |

FOREIGN PATENT DOCUMENTS

| | | |
|---|---|---|
| TW | 454827 | 9/2001 |
| TW | 454839 | 9/2001 |
| TW | 459938 | 10/2001 |

* cited by examiner

*Primary Examiner*—Alison Pickard
*Assistant Examiner*—Vishal Patel
(74) *Attorney, Agent, or Firm*—Birch, Stewart, Kolasch & Birch, LLP

(57) ABSTRACT

A shaft sealing device includes a shaft tube, a main body, a fixed sealing ring, a positioning ring and a retaining ring. The shaft tube is provided with an outer flange and a rotary ring mounted thereto. The main body has an axial hole for supporting the shaft tube which is rotatably extended therethrough. The fixed sealing ring and the retaining ring are inserted in the axial hole of the main body while the positioning ring being mounted in the axial hole. The fixed sealing ring, the retaining ring and the positioning ring are disposed on the shaft tube in loose fit manner to allow for rotation. The fixed sealing ring has a first side to abut against the rotary ring, and a second side to connect to the retaining ring. The positioning ring is provided with elastic members adapted to bias the retaining ring against the fixed sealing ring.

7 Claims, 3 Drawing Sheets

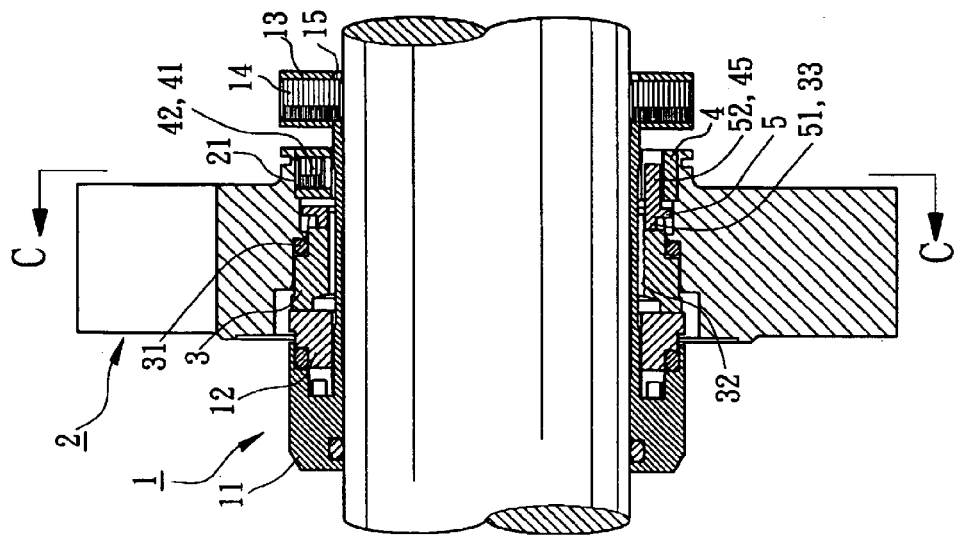
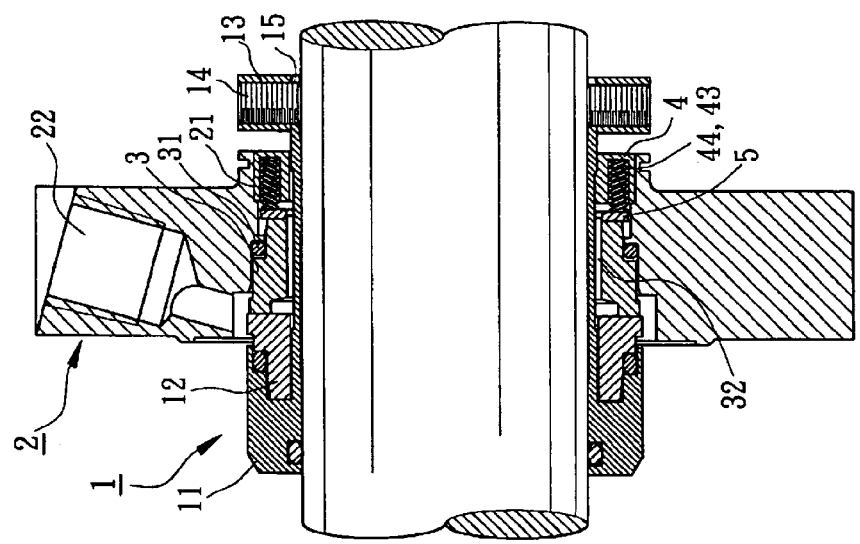

SHAFT SEALING DEVICE HAVING A POSITIONING RING AND A RETAINING RING THEREOF

This Nonprovisional application claims priority under 35 U.S.C.§119(a) on Patent Application No(s). 092210752 filed in TAIWAN on Jun. 12, 2003, the entire contents of which are hereby incorporated by reference.

BACKGROUND OF THE INVENTION

1. Field of the Invention

The present invention is related to a shaft sealing device having a positioning ring and a retaining ring thereof. More particularly, the present invention is related to the shaft sealing device employing the positioning ring and the retaining ring to reinforce and simplify the entire structure that reduces manufacture cost.

2. Description of the Related Art

Applicant own Taiwanese patent publication No. 454827, entitled "SHAFT SEALING DEVICE FOR A ROTARY MACHINE," discloses a shaft sealing device including a shaft tube, a positioning sleeve, a first sealing ring unit, a main body, a second sealing ring unit and a fixed sleeve. Each of the first sealing ring units is essentially consisted of a rotary ring and a fixed ring. Sealing parts of the shaft sealing device of No. 454827 are successively assembled on a rotary shaft.

Another applicant own Taiwanese patent publication No. 454839, entitled "SHAFT SEALING DEVICE FOR A ROTARY MACHINE (2)," also discloses a shaft sealing device including a shaft tube, a positioning sleeve, a rotary ring, a fixed ring, a main body, a sealing ring unit and a fixed sleeve. Sealing parts of the shaft sealing device of No. 454839 are successively assembled on a rotary shaft.

However, the rotary rings and the fixed rings of the shaft sealing devices of Nos. 454827 and 454839 are connected with each other by positioning pins within positioning holes that may complicate and increase manufacture cost. Since the structure of the positioning pins are weakened, the rotational movement of the shaft sealing device is not smooth.

Another applicant own Taiwanese patent publication No. 459938, entitled "SECTIONAL SHAFT SEALING DEVICE FOR A ROTARY MACHINE USE," also discloses a shaft sealing device. The shaft sealing device includes a shaft tube, a first rotary ring unit, a first sealing ring unit, a main body, a second rotary ring unit and a second sealing ring unit. An end of the shaft tube and the first rotary ring unit are connected each other by at least one positioning member, such as a pin.

Although the positioning member connected the end of the shaft tube with the first rotary ring of No. 459938 may increase intensity of the entire structure, it still complicates the entire structure and increases manufacture cost.

The present invention intends to provide a shaft sealing device having a positioning ring and a retaining ring thereof to reinforce and simplify the entire structure that reduces manufacture cost in such a way to mitigate and overcome the above problem.

SUMMARY OF THE INVENTION

The primary objective of this invention is to provide a shaft sealing device having a positioning ring and a retaining ring thereof. The positioning ring and the retaining ring may commonly intensify the entire structure of the shaft sealing device.

The secondary objective of this invention is to provide a shaft sealing device having a positioning ring and a retaining ring thereof which are simplified so that parts of the shaft sealing device is reduced.

The shaft sealing device in accordance with the present invention includes a shaft tube, a main body, a fixed sealing ring, a positioning ring and a retaining ring. The shaft tube is provided with a first end having an outer flange and a rotary ring mounted thereto. And the shaft tube is further provided with a second end mechanically connected with a stop ring. The main body has an axial hole for supporting the shaft tube which is rotatably extended therethrough, and a plurality of passages for supplying and cycling fluid. The fixed sealing ring and the retaining ring are inserted in the axial hole of the main body while the positioning ring being mounted in the axial hole. The fixed sealing ring, the retaining ring and the positioning ring are disposed on the shaft tube in loose fit manner to allow for rotation. The fixed sealing ring has a first side to abut against the rotary ring mounted to the outer flange, and a second side to connect to the retaining ring. The retaining ring is located between the fixed sealing ring and the positioning ring. The positioning ring is provided with a plurality of elastic members adapted to bias the retaining ring against the fixed sealing ring so that rotational movement of the fixed sealing ring can be avoided.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein:

FIG. 2 is a cross-sectional view, taken along line A—A in FIG. 4, of the shaft sealing device in accordance with the preferred embodiment of the present invention;

FIG. 3 is a cross-sectional view, taken along line B—B in FIG. 4, of the shaft sealing device in accordance with the preferred embodiment of the present invention.

DETAILED DESCRIPTION OF THE INVENTION

Figure 1:
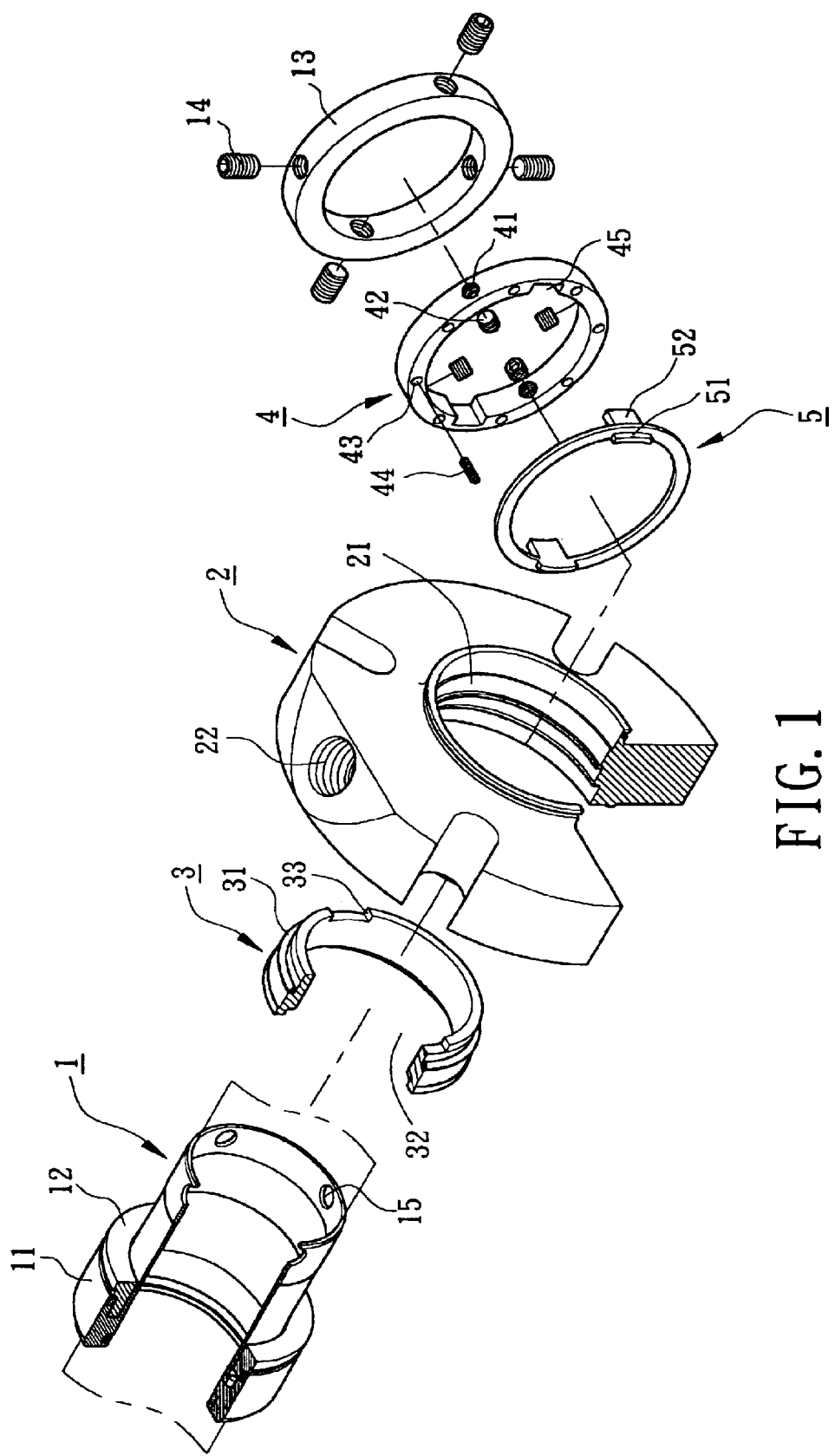
FIG. 1 is an exploded perspective view of a shaft sealing device having a positioning ring and a retaining ring in accordance with a preferred embodiment of the present invention.

Referring initially to FIG. 1, a shaft sealing device in accordance with the preferred embodiment of the present invention includes a shaft tube 1, a main body 2, a fixed sealing ring 3, a positioning ring 4 and a retaining ring 5.

Turning now to FIG. 2, the shaft tube 1, the main body 2, the fixed sealing ring 3, the positioning ring 4 and the retaining ring 5 of the shaft sealing device are successively assembled on a rotary shaft (not labeled) to constitute a rotary mechanism.

Construction of the shaft tube 1 shall be described in detail, referring again to FIGS. 1 and 2. The shaft tube 1 is a tubular member having a first end and a second end connected thereto. A rotary shaft is able to extend through a longitudinal hole of the shaft tube 1, and fittingly fixed therein. The first end of the shaft tube 1 is provided with an outer flange 11 and a rotary ring 12 mounted thereto. And the second end of the shaft tube 1 is further mechanically connected with a stop ring 13 for limiting axial movement. A series of screw holes 15 are equi-spaced around the second end of the shaft tube 1. Screw members 14 are combined with the screw holes 15 to mount the stop ring 13 on the second end of the shaft tube 1 and the rotary shaft.

Construction of the main body 2 shall be described in detail, referring again to FIGS. 1 and 2. The main body 2 has an axial hole 21 for supporting the shaft tube 1 which is rotatably extended therethrough, and a plurality of passages 22 connected an outer peripheral surface with the axial hole 21 for supplying and cycling fluid.

Construction of the fixed sealing ring 3 shall be described in detail, referring again to FIGS. 1 and 2. The fixed sealing ring 3 is a ring member and has an outer ring 31 on its outer circumference to increase its sealing effect. The fixed sealing ring 3 is inserted in the axial hole 21 of the main body 2 and thus the outer ring 31 is engaged with an inner flange (not labeled) of the main body 2. The fixed sealing ring 3 has an axial hole 32 to allow for receiving the shaft tube 1. And the fixed sealing ring 3 is disposed on the shaft tube 1 in loose fit manner to allow for rotation. The fixed sealing ring 3 has a first side to abut against the rotary ring 12 mounted to the outer flange 11, and a second side to connect to the retaining ring 5. To limit rotation, the fixed sealing ring 3 is further provided with a pair of engaging notches 33 on its end opening for positioning purpose.

Figure 4:
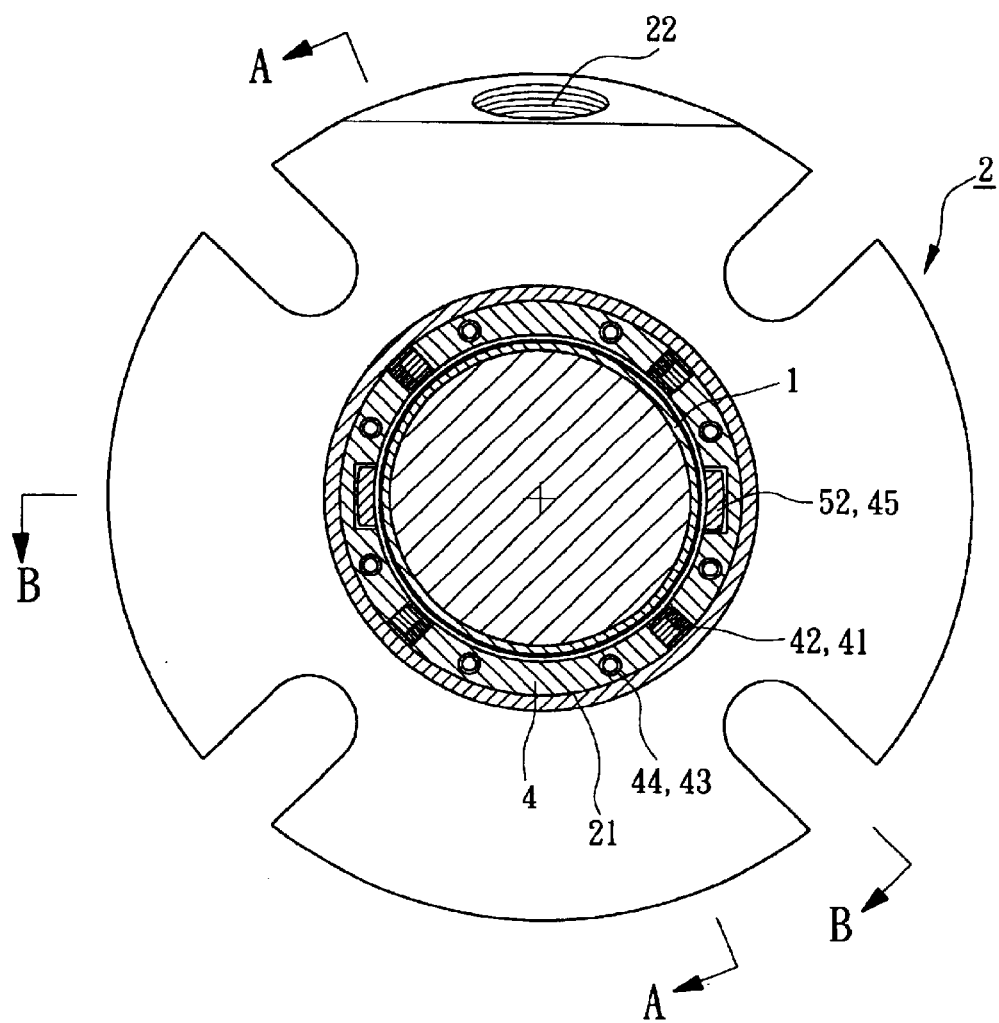
FIG. 4 is cross-sectional view, taken along line C—C in FIG. 3, of the shaft sealing device in accordance with the preferred embodiment of the present invention.

Construction of the positioning ring 4 shall be described in detail, referring now to FIGS. 3 and 4. The positioning ring 4 is a ring member which is inserted in the axial hole 21 of the main body 2 and mounted thereto. A series of screw holes 41 are equi-spaced around the positioning ring 4 for screw connection to the main body 2 by screw members 42. Moreover, a series of positioning holes 43 are equi-spaced on a side wall of the positioning ring 4 which faces the retaining ring 5 with respect to an axis of the main body 2. Each of elastic members 44, such as springs, is inserted into the corresponding positioning hole 43 and has an end adapted to axially bias the retaining ring 5, as shown in FIG. 2. A pair of engaging grooves 45 is longitudinally extended on an inner periphery of the retaining ring 4 for positioning purpose.

Construction of the retaining ring 5 shall be described in detail, referring back to FIGS. 1 and 3. The retaining ring 5 is a ring member which has a first sidewall and a second sidewall opposite to the first sidewall. The retaining ring 5 is inserted in the axial hole 21 of the main body 2. A pair of first engaging members 51 projects from the first side of the retaining ring 5 and engages with the corresponding engaging notches 33 of the fixed sealing ring 3 for limiting rotation. Similarly, a pair of second engaging members 52 projects from the second side of the retaining ring 5 and engages with the corresponding engaging grooves 45 of the positioning ring 4 for limiting rotation. Preferably, each of the first engaging members 51 is longitudinally aligned with the corresponding second engaging member 52 so as to simplify the entire structure.

Referring again to FIGS. 2 and 3, the retaining ring 5 is located between the fixed sealing ring 3 and the positioning ring 4 after assembling. In rotational operation, the axial movements of the fixed sealing ring 3 and the retaining ring 5 are allowed when the elastic members 44 bias the retaining ring 5 against the fixed sealing ring 3. Accordingly, the first side of the fixed sealing ring 3 abuts against the rotary ring 12 to increase sealing effect by means of the elastic members 44. Preferably, the fixed sealing ring 3 is made of hardwearing material which is relatively rigid and strong in rotational operation. To reduce operating temperature of the fixed sealing ring 3 it is preferable to manufacture the fixed sealing ring 3 to have as low friction characteristic as possible.

Referring again to FIG. 3, the rotational movement of the fixed sealing ring 3 can be avoided since the first engaging member 51 of the retaining ring 5 is engaged with the engaging notch 33 of the fixed sealing ring 3. As explained above, the entire structural combination of the fixed sealing ring 3, the positioning ring 4 and the retaining ring 5 in the present invention is intensified and simplified.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A shaft sealing device, comprising:

a shaft tube having a first end on which provided with a rotary ring, and a second end;

a main body provided with an axial hole;

a fixed sealing ring being inserted in the axial hole of the main body and adapted to confront with the rotary ring;

a positioning ring being inserted in the axial hole of the main body and mounted to the main body, the positioning ring provided with at least one positioning hole and at least one elastic member inserted thereinto; and a retaining ring being inserted in the axial hole of the main body, the retaining ring having a first sidewall and a second sidewall;

wherein the fixed sealing ring, the retaining ring and the positioning ring are disposed on the shaft tube in loose fit manner to allow for rotation of the shaft tube; and wherein the retaining ring is located between the fixed sealing ring and the positioning ring after assembling, and the first side wall of the retaining ring connected with the fixed sealing ring to limit rotation while the second side wall of the retaining ring being biased by the elastic member of the positioning ring, the first sidewall of the retaining ring including at least one first engaging member, the second sidewall of the retaining ring including at least one second engaging member, the first engaging member being longitudinally aligned with the corresponding second engaging member so as to simplify the entire structure of the retaining ring.

2. The shaft sealing device as defined in claim 1, wherein the first end of the shaft tube formed with an outer flange for mounting the rotary ring.

3. The shaft sealing device as defined in claim 1, wherein the second end of the shaft tube is mechanically connected with a stop ring for limiting axial movement.

4. The shaft sealing device as defined in claim 1, wherein the main body includes a plurality of passages connected an outer peripheral surface to the axial hole.

5. The shaft sealing device as defined in claim 1, wherein the first sidewall of the retaining ring includes at least one engaging member projected therefrom; the engaging member is engaged with an engaging notch of the fixed sealing ring.

6. The shaft sealing device as defined in claim 1, wherein the second sidewall of the retaining ring includes at least one engaging member projected therefrom; the engaging member is engaged with an engaging groove of the positioning ring.

7. The shaft sealing device as defined in claim 1, wherein the fixed sealing ring includes an outer ring on its outer circumference to increase its sealing effect.

* * * * *